Figure 1:
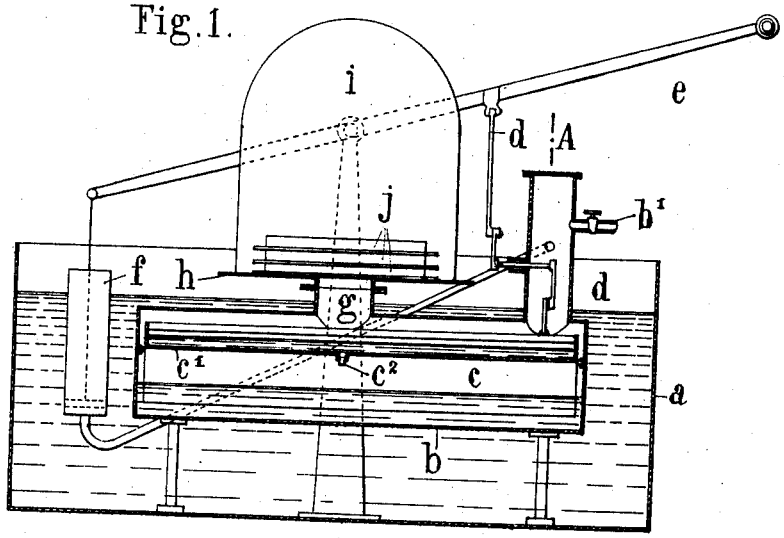

No. 864,978. PATENTED SEPT. 3, 1907.
L. A. MOREL.
PROCESS OF OBTAINING DRY GLUTEN.
APPLICATION FILED JULY 1, 1905.

2 SHEETS—SHEET 1.

Witnesses:
John A. Aehlenbeck
John Lotka

Inventor
Louis Alphonse Morel
By
Briesen & Knauth
his Attorneys

No. 864,978. PATENTED SEPT. 3, 1907.
L. A. MOREL.
PROCESS OF OBTAINING DRY GLUTEN.
APPLICATION FILED JULY 1, 1905.
2 SHEETS—SHEET 2.
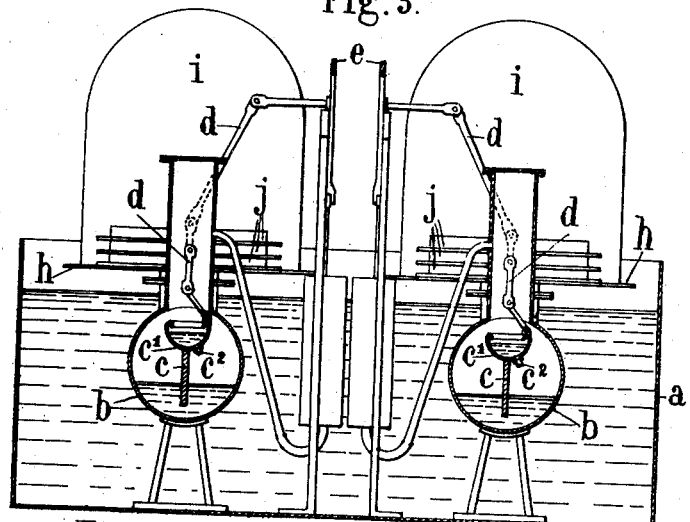
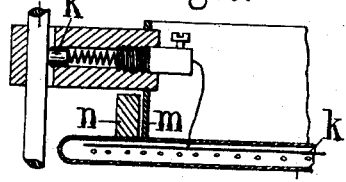
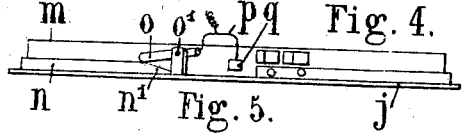
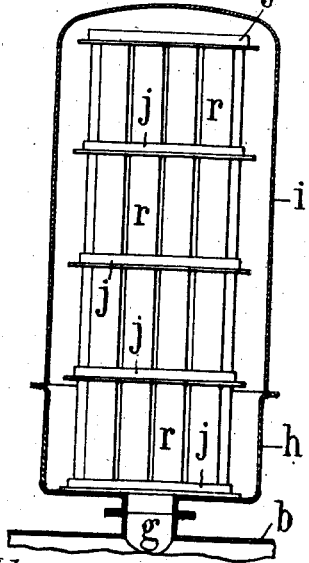
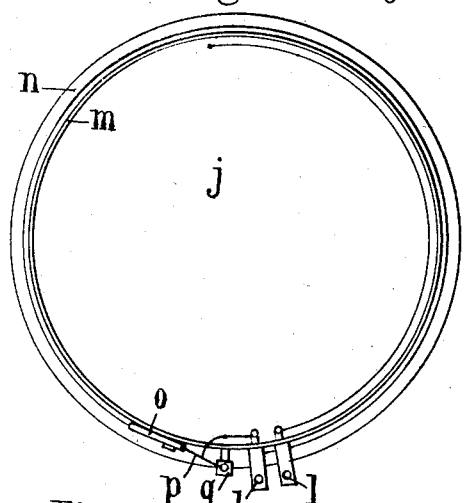
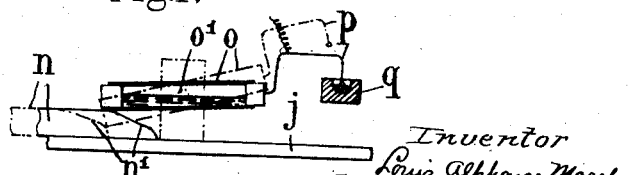
Witnesses:
John A. Stellenbeck
John Locke
Inventor
Louis Alphonse Morel
By Briesen & Knauth
his Attorneys

UNITED STATES PATENT OFFICE.

LOUIS ALPHONSE MOREL, OF MEAUX, FRANCE.

PROCESS OF OBTAINING DRY GLUTEN.

No. 864,978.  Specification of Letters Patent.  Patented Sept. 3, 1907.

Application filed July 1, 1905. Serial No. 267,960.

*To all whom it may concern:*

Be it known that I, LOUIS ALPHONSE MOREL, of 1 Quai Thiers, Meaux, Seine-et-Marne, Republic of France, manufacturer, have invented a Process of Obtaining Dry Gluten, of which the following is a full, clear, and exact description.

The present invention relates to a process having for object to effect the absolute dehydration and perfect bleaching of gluten upon a commercial scale while at same time sterilizing the gluten and preserving its natural qualities and its expansive and nutritive properties.

The process of this invention enables gluten of absolute whiteness and perfectly dehydrated to be obtained.

The process is in all cases based on the combination of congelation, the action of a vacuum and the action of heat but it is essentially chacterized by the fact that the gluten to be dehydrated is in the first place subjected to an expansion effect before being frozen so that the water contained in the gluten is held in suspension in a finely divided condition before being converted into ice. Under these conditions the water thus subdivided is capable of passing suddenly from the solid state into the state of vapor without leaving any trace of humidity upon the gluten. The present process is moreover characterized by the employment of electricity for heating the frozen gluten so as to permit of maintaining a perfect vacuum during the absorption of the water resulting from the melting of the ice.

The following is the process of this invention:

The wet gluten to be treated is placed beneath a bell, the interior of which communicates with a receiver containing a moisture absorbing matter such for example as sulfuric acid at 66° B. In the first place a vacuum is produced in the interior of the bell by means of a pump of any kind, such as a Westinghouse pump for example, until the internal pressure does not exceed about 60 mm., after which the vacuum is maintained by means of a smaller pump which will permit of obtaining a vacuum almost to within one millimeter or half a millimeter of an absolute vacuum.

Under the action of the vacuum the gluten first of all begins to expand and form cells in the interior of the mass, which develop progressively and as the vacuum is carried still further to within one millimeter or even less, the freezing of the water which is subdivided in the mass of gluten during the expansion of the latter is brought about by the action of the vacuum. During the congelation the colored parts of the gluten entirely disappear and there are formed in the first place white specks which gradually increase in diameter and finally when the freezing is complete the whole mass of gluten will be found to have become white both interiorly and exteriorly. The water to be eliminated is thus in a state of suspension in the form of ice within the expanded mass of gluten which is always maintained in a high vacuum.

The plates upon which the cakes of gluten rest are then heated electrically and brought to a temperature of about 120° C; the gluten being thus heated in a vacuum of within one millimeter or half a millimeter of an absolute vacuum, which may be maintained as before stated during the heating in consequence of the employment of electricity. Under the combined action of this vacuum and of this heat, the water passes suddenly from a solid state into a state of vapor without leaving any trace of humidity upon the cake of gluten this sudden change being due to the state of fine subdivision of the water or rather ice; as soon as a portion of this finely divided ice melts, the liquid is instantaneously evaporated by the action of the vacuum. The vapor thus formed is absorbed immediately as and when it is produced by sulfuric acid at 66° B contained in a vessel in communication with the chamber in which the gluten is contained; this sudden evaporation upon the one hand and the immediate absorption of the vapor formed by the acid producing such an absorption of heat that the cake of gluten remains frozen until its complete dehydration. When this dehydration is terminated air is re-admitted into the interior of the chamber containing the gluten, which latter is then removed from the apparatus.

The gluten whose mass had been increased in volume at the commencement of the operation as before stated, preserves after its dehydration the same aspect, its development remains the same, it always contains cells in its interior and it remains perfectly white both interiorly and exteriorly.

The gluten would generally be placed in molds before being subjected to dehydration so as to present after its expansion and dehydration a suitable form. The gluten may be employed either in the condition in which it leaves the apparatus or after it has been baked by means of a current of hot air.

The present process of dehydration may be applied not only to pure gluten, but also to gluten containing any suitable proportion of wheat flour (50 to 60% for example) the phenomena hereinbefore specified being alike produced in this case and the final product being a very white, very light biscuit whose degree of compactness would vary according to the proportion of the added flour.

The process may be carried out in any suitable apparatus, the accompanying drawing showing an arrangement of apparatus adapted for the purpose.

Figure 2:
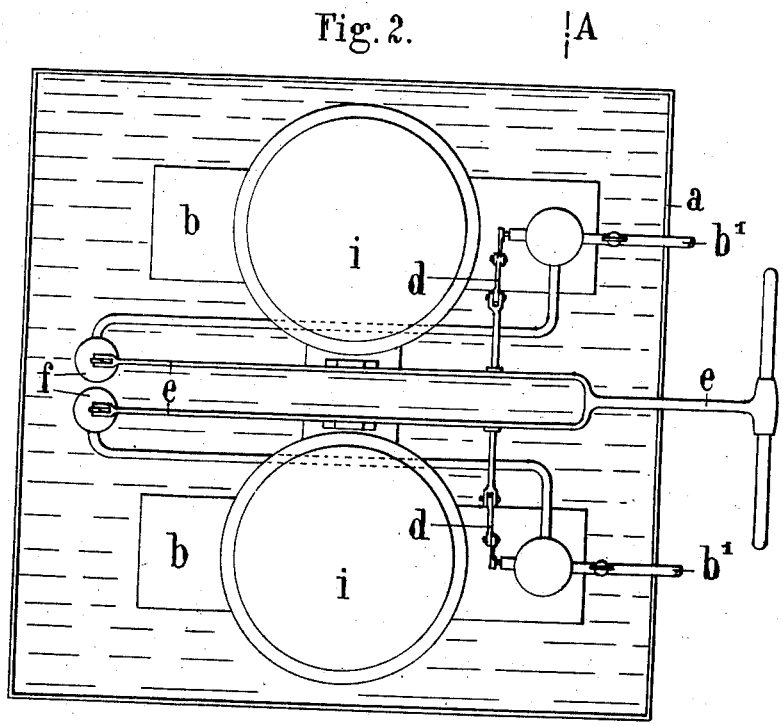

Figure 1 is a longitudinal section, Fig. 2 a plan and Fig. 3 a transverse vertical section of the apparatus on line A A, Fig. 1, Figs. 4 and 5 are detail views showing an elevation and plan of one of the plates upon which the gluten to be treated is placed. Fig. 6 is a detail view drawn upon a larger scale showing a part vertical section of one of the plates. Fig. 7 is a detail view of a temperature regulator for the plates. Fig. 8 shows a series of molds placed upon a series of electrically heated plates.

The apparatus consists as shown in the drawing of a tank $a$ containing water kept constantly cool in which is immersed one, two or more receptacles $b$ containing sulfuric acid at 66° B. The cooling of the water can be accomplished in any suitable manner, as by renewing it periodically, or employing a constant flow, or otherwise. In each receptacle $b$ is disposed a dasher $c$ operated by a connecting rod $d$ through a hand lever $e$. The dasher is preferably provided at its upper part with a trough $c^1$ having an inwardly turned rim, serving to contain a certain quantity of fresh acid which is poured at the termination of the operation into the receptacle $b$ for enriching the acid contained therein. The trough $c^1$ is provided with a plug $c^2$ by removing which the acid contained in said trough may be run off into the receptacle $b$.

The quantity of fresh acid contained in the trough $c^1$ and discharged therefrom is such as to sufficiently enrich the spent acid at the end of one operation, to enable it to be used efficiently for the next operation.

Each receptacle $b$ is provided with a tubular neck $g$ (Figs. 1 & 8) upon which is mounted a plate or disk $h$ surmounted by a bell $i$ forming a chamber for containing the electrically heated plates $j$ upon which the gluten to be treated is placed. Each plate is made hollow and contains an asbestos covered wire $k$ made of sufficient length to heat, when traversed by the electric current, both faces of the plate to the desired temperature; each extremity of said wire being connected to a spring contact $k^1$ mounted on the rim $m$ of the plate and the current being conducted to the several plates by two rods $l$ connected to the two poles of the source of electricity, through the spring contacts $k^1$. Each plate carries outside the rim $m$ a metal ring $n$ one of whose extremities is fixed to the plate while the other extremity is free, so as to permit of the expansion of said ring, said free end terminating in a bevel $n^1$ (Fig. 4) upon which rests an oscillating tube $o$ mounted on pivots $o^1$ and containing mercury; said tube carries a rod $p$ connected to one of the poles of the source of electricity, the end of which tube normally dips, that is to say so long as the temperature of the plate has not attained its highest limit, into a cup $q$ containing mercury and connected with the other pole of the source of electricity.

On the current being transmitted to the wire $k$ of a plate, the wire becoming heated raises the temperature of said plate and ring $n$ expands and when the limit of temperature is reached the ring $n$ will have expanded to such an extent as to release the tube $o$ which is then free to oscillate upon its pivots as shown in dot and dash lines in Fig. 7, the tube $o$ then occupying the position shown in dotted lines and raising rod $p$ out of cup $q$ and thus breaking the circuit. On the current ceasing the temperature of the plate falls, rings $n$ contracts and finally returns to its initial position, tube $o$ resuming its horizontal position, and rod $p$ again dipping in the mercury in cup $q$ and thus closing the circuit. The transmission of the current to the heating wire of each plate is thus regulated automatically, so that the temperature of the plates can never exceed a given limit.

The gluten to be treated is either placed in the form of cakes upon the plates $j$ piled one on the other as shown in Fig. 1, or the gluten may be placed in perforated molds $r$ in which latter case the plate of one row would rest upon the molds of the row below as shown in Fig. 8.

The interior of the receptacle $b$ is connected by a pipe $b^1$ with any suitable kind of pump for producing a vacuum in the chamber constituted by the disk $h$ and bell $i$ inclosing the several plates $j$; or when the pressure is not more than about 60 mm. the vacuum is continued to be produced by means of the small pump $f$ until a vacuum is obtained within one mm. or half a mm. It will be evident that the small pump $f$ which may be of any kind, may also be driven by a motor such as an electric motor for example.

As has been before explained under the action of the vacuum, the gluten placed on plates $j$ expands and when placed in the molds $r$ its expansion is limited, the gluten being thus expanded the water contained becomes sub-divided throughout the mass and freezes under the action of the rapid evaporation produced by the vacuum and the acid contained in the troughs $c^1$ and receptacles $b$.

When the congelation is complete and the whole mass has become white, the current is conducted to the wires $k$ contained in plates $j$ and under the action of the heat thus developed (about 120°) the ice melts but the water resulting from this fusion is immediately evaporated under the action of the perfect vacuum which is always maintained in bell $i$ and of the acid beneath the same, the evaporation being so rapid that the gluten remains frozen during this operation and until absolute dehydration is effected.

The gluten acquires in the course of the operation a snowy whiteness which it preserves in the dry state. The cakes of gluten on being removed after treatment have a very white appearance and interiorly present a very uniform cellular structure.

The gluten may be either sold as food after it has been salted or sweetened and baked in a current of very dry hot air under pressure or it may be simply pulverized and sold in the form of white flour.

The purity of the gluten after being dehydrated and bleached as described is preserved as well as the whole of its natural qualities.

Claims.

1. A process for the dehydration and bleaching of gluten, which consists in first subjecting the wet gluten to expansion in order to bring the water contained therein into a state of extreme subdivision, then freezing the gluten together with the water, then melting the ice, vaporizing the resulting water and removing it from the gluten.

2. A process for the dehydration and bleaching of gluten, which consists in subjecting the wet gluten to the action of a vacuum, thus causing it to swell, and the water contained therein to become finely subdivided and frozen, and thereupon melting the ice and vaporizing the resulting water by heating under a vacuum and disposing of the vapor.

3. A process for the dehydration and bleaching of gluten, which consists in subjecting the wet gluten to the action of a vacuum, thus causing it to swell, and the water contained therein to become finely subdivided and frozen, and thereupon melting the ice and vaporizing the resulting water by heating under a vacuum and causing the vapor to be taken up by an absorbent.

The foregoing specification of my process for obtaining dry gluten signed by me this twentieth day of June 1905.

LOUIS ALPHONSE MOREL.

Witnesses:
HANSON C. COXE,
MAURICE H. PIGNET.